United States Patent [19]

Terane

[11] Patent Number: 5,357,457
[45] Date of Patent: Oct. 18, 1994

[54] ADDER WITH CARRY LOOK AHEAD CIRCUIT

[75] Inventor: Hideyuki Terane, Hyogo, Japan

[73] Assignee: Mitsubishi Denki Kabushiki Kaisha, Tokyo, Japan

[21] Appl. No.: 38,202

[22] Filed: Mar. 26, 1993

[30] Foreign Application Priority Data

Jul. 30, 1992 [JP] Japan .................. 4-203788

[51] Int. Cl.$^5$ .............................. G06F 7/50
[52] U.S. Cl. .............................. 364/787
[58] Field of Search ............ 364/787, 788, 786, 784

[56] References Cited
U.S. PATENT DOCUMENTS 4,737,926  4/1988  Uo et al. ................ 364/787

FOREIGN PATENT DOCUMENTS 62-172429  7/1987  Japan .
64-50123   2/1989  Japan .
2-245926  10/1990  Japan .
3-91832    4/1991  Japan .
3-228122  10/1991  Japan .

Primary Examiner—Jerry Smith
Assistant Examiner—Emmanuel Moise
Attorney, Agent, or Firm—Lowe, Price, LeBlanc & Becker

[57] ABSTRACT

An adder circuit for adding two 16-bit data to each other includes 16 full adders and three carry look ahead circuits. A plurality of full adders excluding two ones provided on the least significant bit side and two ones provided on the most significant bit side are classified into three groups. Each of the groups includes four full adders. A single carry look ahead circuit is provided for the four full adders forming each group.

9 Claims, 11 Drawing Sheets

FIG. 10 PRIOR ART
| STATE | A | B | CI | P | CO | S |
|---|---|---|---|---|---|---|
| KILL | 0 | 0 | 0 | 0 | 0 | 0 |
| PROPAGATION | 0 | 1 | 0 | 1 | 0 | 1 |
| PROPAGATION | 1 | 0 | 0 | 1 | 0 | 1 |
| GENERATION | 1 | 1 | 0 | 0 | 1 | 0 |
| KILL | 0 | 0 | 1 | 0 | 0 | 1 |
| PROPAGATION | 0 | 1 | 1 | 1 | 1 | 0 |
| PROPAGATION | 1 | 0 | 1 | 1 | 1 | 0 |
| GENERATION | 1 | 1 | 1 | 0 | 1 | 1 |
$P = A \oplus B$
$P = 1 : S=/CI, CO=CI$
$P = 0 : S=CI, CO=A=B$
FIG. 11(a)
PRIOR ART
FIG. 11(b)
PRIOR ART
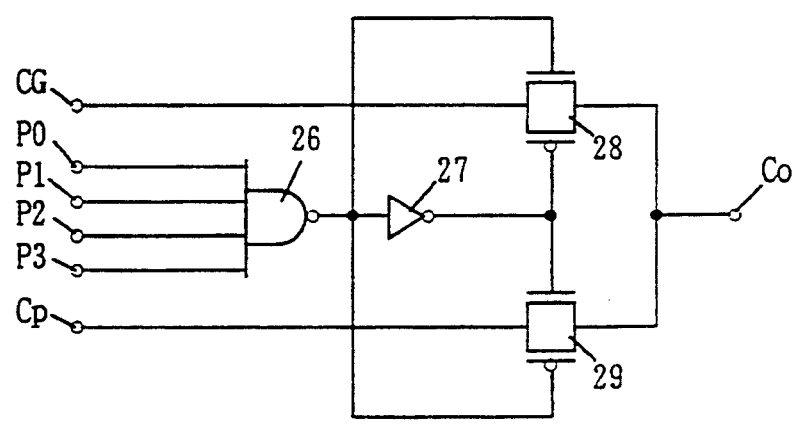

FIG. 12 PRIOR ART

| P0·P1·P2·P3 | Co |
|---|---|
| 0 | CG |
| 1 | Cp |

ADDER WITH CARRY LOOK AHEAD CIRCUIT

BACKGROUND OF THE INVENTION

1. Field of the Invention

The present invention relates to an adder circuit, and more particularly, it relates to an adder provided with carry look ahead circuits.

2. Description of the Background Art

FIG. 8 is a block diagram showing the structure of a conventional adder circuit for adding two 16-bit data to each other.

The first 16-bit data is formed by data A0 to A15, while the second 16-bit data is formed by data B0 to B15. This adder circuit includes 16 full adders 1 to 16 corresponding to the data A0 to A15 and B0 to B15, and four carry look ahead circuits 20 to 23.

The full adders 1 to 16 are supplied with the data A0 to A15 and B0 to B15 in data input terminals A and B thereof respectively. The 16 full adders 1 to 16 are classified into four groups, so that each group is provided with one of the carry look ahead circuits.

A carry input terminal CI of the full adder 1 and a propagation carry input terminal Cp of the carry look ahead circuit 20 are connected to a least significant carry input terminal CL. Carry input terminals CI of the full adders 2, 3 and 4 are connected to carry output terminals CO of the full adders 1, 2 and 3 provided on the low order sides respectively. A carry output terminal CO of the full adder 4 is connected to a generation carry input terminal CG of the carry look ahead circuit 20. Propagation detecting terminals P of the full adders 1, 2, 3 and 4 are connected to propagation detecting input terminals P0, P1, P2 and P3 of the carry look ahead circuit 20 respectively. The least significant carry input terminal CL is grounded.

Similarly to the above, full adders 5, 6, 7 and 8 are connected to a carry look ahead circuit 21, full adders 9, 10, 11 and 12 are connected to a carry look ahead circuit 22, and full adders 13, 14, 15 and 16 are connected to a carry look ahead circuit 23.

A carry input terminal CI of the full adder 5 and a propagation carry input terminal Cp of the carry look ahead circuit 21 are connected to a carry output terminal Co of the carry look ahead circuit 20. A carry input terminal CI of the full adder 9 and a propagation carry input terminal Cp of the carry look ahead circuit 22 are connected to a carry output terminal Co of the carry look ahead circuit 21. A carry input terminal CI of the full adder 13 and a propagation carry input terminal Cp of the carry look ahead circuit 23 are connected to a carry output terminal Co of the carry look ahead circuit 22. A carry output terminal Co of the carry look ahead circuit 23 is connected to a most significant carry output terminal CM.

Sum signals S0 to S15 are outputted from sum signal output terminals S of the full adders 1 to 16 respectively. These sum signals S0 to S15 form a 16-bit data expressing the sum of the first and second 16-bit data.

FIG. 9 shows a block diagram illustrating a single full adder and a circuit diagram illustrating an exemplary structure of the full adder at (a) and (b) respectively. FIG. 10 illustrates the truth table of the full adder shown in FIG. 9.

The full adder shown in FIG. 9 includes an exclusive OR gate 33, inverters 34 and 35, and transfer gates 36, 37, 38 and 39. A data input terminal A is supplied with one bit of a binary data, while another data input terminal B is supplied with one bit of another binary data. A carry input terminal CI is supplied with a carry signal which is outputted from a full adder provided on a low order side.

A signal at a propagation detecting terminal P expresses exclusive OR of the data received in the data input terminals A and B. Namely, the signal at the propagation detecting terminal P is "1" when the data received in the data input terminal A is different from that received in the data input terminal B, while this signal is "0" when the former is identical to the latter.

When the signal at the propagation detecting terminal P is "1", the transfer gates 37 and 39 are turned on and the transfer gates 36 and 38 are turned off. Thus, an inversion signal of the carry signal received in the carry input terminal CI is propagated to a sum signal output terminal S, while the carry signal received in the input terminal CI is propagated to a carry output terminal CO.

When the signal at the propagation detecting terminal P is "0", on the other hand, the transfer gates 36 and 38 are turned on and the transfer gates 37 and 39 are turned off. Therefore, the carry signal received in the carry input terminal CI is propagated to the sum signal output terminal S, while the data received in the data input terminal B is propagated to the carry output terminal CO.

As shown in FIG. 10, the signal at the propagation detecting terminal P is "0" when both of the data received in the data input terminals A and B are "0". Thus, the carry signal received in the carry input terminal CI is propagated to the sum signal output terminal S. When the carry signal received in the carry input terminal CI is "0", therefore, a sum signal at the sum signal output terminal S is also "0", while the sum signal at the sum signal output terminal S is "1" when the carry signal received in the carry input terminal CI is "1". The data received in the data input terminal B is propagated to the carry output terminal CO. Thus, the carry signal at the carry output terminal CO is "0". This state is called a kill state.

When both of the data received in the data input terminals A and B are "1", on the other hand, the signal at the propagation detecting terminal P is "0". Thus, the carry signal received in the carry input terminal CI is propagated to the sum signal output terminal S. When the carry signal received in the carry input terminal CI is "0", therefore, the sum signal at the sum signal output terminal S is also "0", while this signal is "1" when the carry signal received in the carry input terminal CI is "1". The data received in the data input terminal B is propagated to the carry output terminal CO. Thus, the carry signal at the carry output terminal CO is "1". This state is called a generation state.

When the data received in the data input terminals A and B are different from each other, the signal at the propagation detecting terminal P is "1". Thus, an inversion signal of the carry signal received in the carry input terminal CI is propagated to the sum signal output terminal S. When the carry signal received in the carry input terminal CI is "0", therefore, the sum signal at the sum signal output terminal S is "1", while this signal is "0" when the carry signal in the carry input terminal CI is "1". The carry signal received in the carry input terminal CI is propagated to the carry output terminal CO. When the carry signal received in the carry input terminal CI is "0", therefore, the carry signal at the carry output terminal CO is also "0", while this signal is "1" when the carry signal received in the carry input terminal CI is "1". This state is called a propagation state.

Thus, the carry signal at the carry output terminal CO is "0" in a kill state regardless of the state of the carry signal received in the carry input terminal CI. In a generation state, on the other hand, the carry signal at the carry output terminal CO is "1" regardless of the state of the carry signal received in the carry input terminal CI. In a propagation state, further, the carry signal received in the carry input terminal CI is propagated to the carry output terminal CO.

In the full adder shown in FIG. 9, the sum of the data received in the data input terminals A and B is obtained at the sum output terminal S as a sum signal and the carry signal is obtained at the carry output terminal CO on the basis of the data received in the data input terminals A and B and the carry signal received in the carry input terminal CI. When the carry signal is propagated from the carry input terminal CI to the carry output terminal CO, the signal (propagation detecting signal) at the propagation detecting terminal P is "1".

FIG. 11 shows a block diagram illustrating a single carry look ahead circuit and a circuit diagram illustrating an exemplary structure of the carry look ahead circuit at (a) and (b) respectively. FIG. 12 illustrates the truth table of the carry look ahead circuit shown in FIG. 11.

The carry look ahead circuit shown in FIG. 11 includes a NAND gate 26, an inverter 27 and transfer gates 28 and 29. Propagation detecting terminals P of four full adders are connected to propagation detecting input terminals P0, P1, P2 and P3 respectively. A generation carry input terminal CG is supplied with a carry signal which is outputted from one of the four full adders provided on the most significant bit side. A propagation carry input terminal Cp is supplied with a carry signal to be inputted in one of the four full adders provided on the least significant bit side.

When any of propagation detecting signals received in the propagation detecting input terminals P0, P1, P2 and P3 is "0", the transfer gate 28 is turned on and the transfer gate 29 is turned off. Thus, the carry signal received in the generation carry input terminal CG is propagated to a carry output terminal Co. When any of the full adders connected to this carry look ahead circuit is in a kill or generation state, therefore, the carry signal received in the generation carry input terminal CG is outputted from the carry output terminal Co.

When all propagation detecting signals received in the propagation detecting input terminals P0, P1, P2 and P3 are "1", on the other hand, the transfer gate 29 is turned on and the transfer gate 28 is turned off. Thus, the carry signal received in the propagation carry input terminal Cp is propagated to the carry output terminal Co. When all of the four full adders connected to this carry look ahead circuit are in propagation states, therefore, the carry signal received in the propagation carry input terminal Cp is outputted from the carry output terminal Co.

As shown in FIG. 12, the carry signal at the carry output terminal Co is equal to the carry signal received in the generation carry input terminal CG when the logical product of the propagation detecting signals received in the propagation detecting input terminals P0, P1, P2 and P3 is "0". When the logical product of the propagation detecting signals received in the propagation detecting input terminals P0, P1, P2 and P3 is "1", on the other hand, the carry signal at the carry output terminal Co is equal to the carry signal received in the propagation input terminal Cp.

As hereinabove described, the carry signal at the carry output terminal CO of each full adder is obtained by propagation of the carry signal received in the carry input terminal CI or the data received in the data input terminal B. Further, the sum signal at the sum signal output terminal S is obtained by propagation of the carry signal received in the carry input terminal CI or an inversion signal thereof.

Thus, the carry signal at the carry output terminal CO is delayed by a transfer gate with respect to the carry signal received in the carry input terminal CI or the data received in the data input terminal B. Further, the sum signal at the sum signal output terminal S is delayed by a transfer gate with respect to the carry signal received in the carry input terminal CI.

In each carry look ahead circuit, on the other hand, the carry signal at the carry output terminal Co is obtained by propagation of the carry signal received in the generation carry input terminal CG or that received in the propagation carry input terminal Cp.

Therefore, the carry signal at the carry output terminal Co is delayed by a transfer gate with respect to the carry signal received in the generation carry input terminal CG or that received in the propagation carry input terminal Cp.

In the adder circuit shown in FIG. 8, the time (delay time) required for obtaining all sum signals S0 to S15 upon supply of the data A0 to A15 and B0 to B15 varies with the states of the full adders 1 to 16.

The maximum delay time is caused when the least significant bit full adder 1 is in a kill or generation state and the remaining full adders 2 to 15 are in propagation states.

In this case, a delay T1 is caused in the full adder 1 by propagation from the data input terminal B to the carry output terminal CO. In the full adder 2, a delay T2 is caused by propagation from the carry input terminal CI to the carry output terminal CO. Similarly, delays T3 and T4 are caused in the full adders 3 and 4 respectively.

Then, a delay T5 is caused in the carry look ahead circuit 20 by propagation from the generation carry input terminal CG to the carry output terminal Co. A delay T6 is caused in the carry look ahead circuit 21 by propagation from the propagation carry input terminal Cp to the carry output terminal Co, while a delay T7 is caused in the carry look ahead circuit 22 by propagation from the propagation carry input terminal Cp to the carry output terminal Co.

Further, a delay T8 is caused in the full adder 13 by propagation from the carry input terminal CI to the carry output terminal CO, while delays T9 and T10 are similarly caused in the full adders 14 and 15 respectively. Finally, a delay T11 is caused in the full adder 16 by propagation from the carry input terminal CI to the sum signal output terminal S.

Thus, a delay of 11 stages is caused before the sum signal S15 is obtained upon supply of the data A0 to A15 and B0 to B15.

SUMMARY OF THE INVENTION

An object of the present invention is to reduce the maximum delay time in an adder circuit.

Another object of the present invention is to provide an adder circuit which can add data at a high speed with a small number of circuits.

An adder circuit according to the present invention comprises n full adders corresponding to n bits. A plurality of full adders excluding h full adders provided on the least significant bit side and i full adders provided on the most significant bit side are classified into m groups. Each of the m groups includes k full adders This adder circuit further comprises m carry look ahead circuits which are provided in correspondence to the m groups so that each carry look ahead circuit is connected to the k full adders included in the corresponding group.

Symbols h and i represent integers of at least 1 and not more than k respectively.

Symbols n, m, h, i and k satisfy the following relation:

$$n = h + k \cdot m + i$$

In the case where n is integral times k, i is at least 1 and not more than k. In the case where n is not integral times k, on the other hand, i is at least 1 and not more than $k-1$.

In the adder circuit, no carry look ahead circuits are provided for the h full adders provided on the least significant bit side and the i full adders provided on the most significant bit side. The remaining plurality of full adders are classified into m groups, and a single carry look ahead circuit is provided for each group. Thus, the maximum delay time is reduced.

According to the present invention, as hereinabove described, no carry look ahead circuits are provided for the h full adders provided on the least significant bit side and the i full adders provided on the most significant bit side among the n full adders, whereby the maximum delay time caused by propagation of the carry signals is reduced. Thus, the adder circuit can add data at a high speed with a small number of circuits.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 illustrates the truth table of the full adder shown in FIG. 9;

FIG. 11 shows a block diagram and a circuit diagram illustrating a carry look ahead circuit and an exemplary structure thereof respectively; and FIG. 12 illustrates the truth table of the carry look ahead circuit shown in FIG. 11.

DESCRIPTION OF THE PREFERRED EMBODIMENTS

(1) First Embodiment

Figure 1:
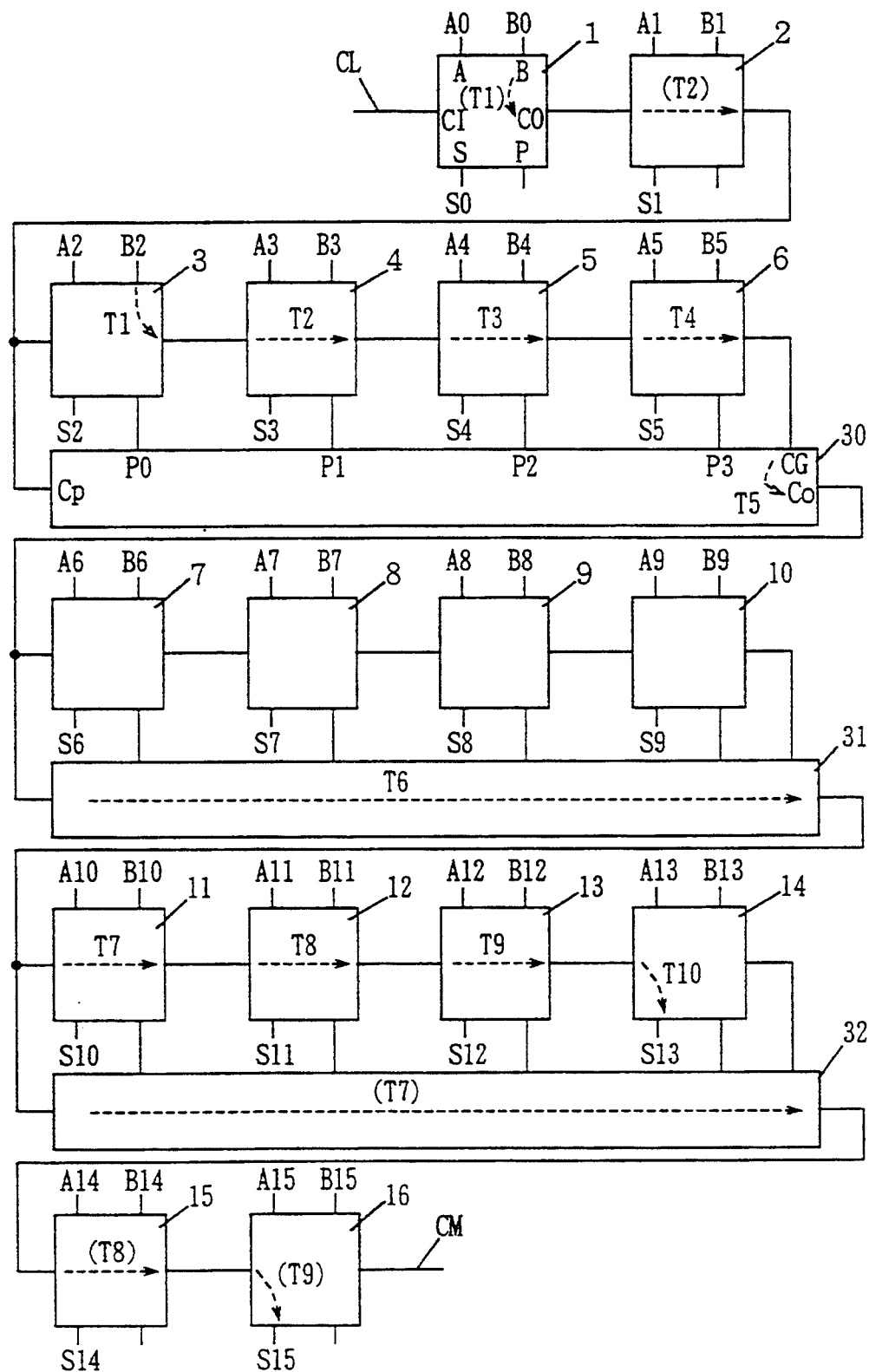
FIG. 1 is a block diagram showing the structure of an adder circuit according to a first embodiment of the present invention.

FIG. 1 is a block diagram showing the structure of an adder circuit according to a first embodiment of the present invention. This adder circuit adds first and second 16-bit data, which are formed by data A0 to A15 and B0 to B15 respectively, to each other.

Figure 9A:
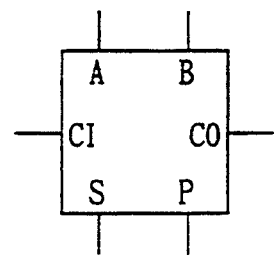
FIG. 9 shows a block diagram and a circuit diagram illustrating a full adder and an exemplary structure thereof respectively.
Figure 9B:
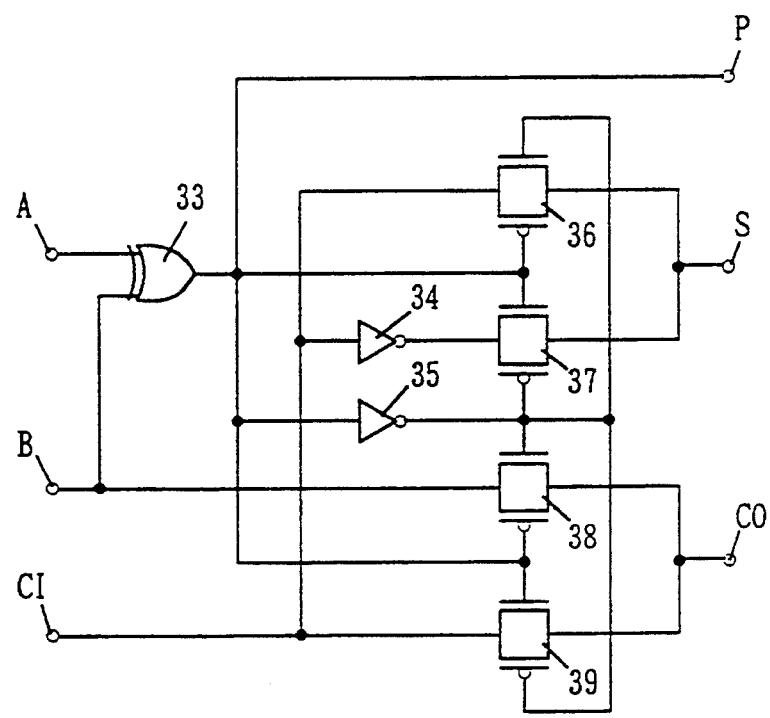
Figure 12:
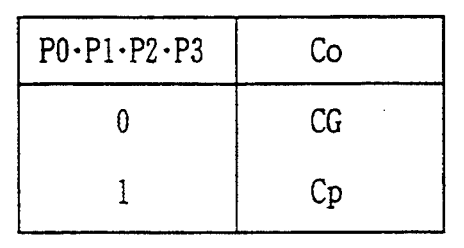

The adder circuit includes 16 full adders 1 to 16 corresponding to the data A0 to A15 and B0 to B15, and three carry look ahead circuits 30, 31 and 32. The structure and operation of each full adder are similar to those shown in FIGS. 9 and 10. Further, the structure and operation of each carry look ahead circuit are similar to those shown in FIGS. 11 and 12.

The full adders 1 to 16 are supplied with the data A0 to A15 and B0 to B15 in data input terminals A and B thereof respectively.

Except the two full adders 1 and 2 provided on the least significant bit side and the two full adders 15 and 16 provided on the most significant bit side, the remaining full adders 3 to 14 are classified into three groups. The first group includes the full adders 3 to 6 and the second group includes the full adders 7 to 10, while the third group includes the full adders 11 to 14. The carry look ahead circuit 30 is provided for the first group of the full adders 3 to 6 and the carry look ahead circuit 31 is provided for the second group of the full adders 7 to 10, while the carry look ahead circuit 32 is provided for the third group of the full adders 11 to 14.

A carry input terminal CI of the full adder 1 is connected to a least significant carry input terminal CL. According to this embodiment, the least significant carry input terminal CL is grounded. A carry input terminal CI of the full adder 2 is connected to a carry output terminal CO of the full adder 1.

A carry input terminal CI of the full adder 3 and a propagation carry input terminal Cp of the carry look ahead circuit 30 are connected to a carry output terminal CO of the full adder 2. Carry input terminals CI of the full adders 4, 5 and 6 are connected to carry output terminals CO of the full adders 3, 4 and 5 provided on the low order bit sides respectively. A carry output terminal CO of the full adder 6 is connected to a generation carry input terminal CG of the carry look ahead circuit 30. Propagation detecting terminals P of the full adders 3, 4, 5 and 6 are connected to propagation detecting input terminals P0, P1, P2 and P3 of the carry look ahead circuit 30 respectively.

Similarly, the full adders 7, 8, 9 and 10 are connected to the carry look ahead circuit 31, while the full adders 11, 12, 13 and 14 are connected to the carry look ahead circuit 32. A carry input terminal CI of the full adder 7 and a propagation carry input terminal Cp of the carry look ahead circuit 31 are connected to a carry output terminal Co of the carry look ahead circuit 30, while a carry input terminal CI of the full adder 11 and a propagation carry input terminal Cp of the carry look ahead circuit 32 are connected to a carry output terminal Co of the carry look ahead circuit 31.

A carry input terminal CI of the full adder 15 is connected to a carry output terminal Co of the carry look ahead circuit 32, while a carry input terminal CI of the full adder 16 is connected to a carry output terminal CO of the full adder 15. A carry output terminal CO of the full adder 16 is connected to a most significant carry output terminal CM.

Sum signal output terminals S of the full adders 1 to 16 output sum signals SO to S15 respectively. These sum signals form a 16-bit data expressing the sum of the first and second 16-bit data.

According to this embodiment, n=16, m=3, k=4, h=2 and i=2 respectively.

In the adder circuit shown in FIG. 1, the maximum delay time is caused when the full adder 3 is in a kill or generation state and the remaining full adders 1, 2 and 4 to 16 are in propagation states.

In this case, a delay T1 is caused in the full adder 3 by propagation from the data input terminal B to the carry output terminal CO. A delay T2 is caused in the full adder 4 by propagation from the carry input terminal CI to the carry output terminal CO. Similarly, delays T3 and T4 are caused in the full adders 5 and 6 respectively.

In the carry look ahead circuit 30, a delay T5 is caused by propagation from the generation carry input terminal CG to the carry output terminal Co. In the carry look ahead circuit 31, on the other hand, a delay T6 is caused by propagation from the propagation carry input terminal Cp to the carry output terminal Co.

Further, a delay T7 is caused in the full adder 11 by propagation from the carry input terminal CI to the carry output terminal CO, while delays T8 and T9 are similarly caused in the full adders 12 and 13 respectively. Finally, a delay T10 is caused in the full adder 14 by propagation from the carry input terminal CI to the sum signal output terminal S.

Thus, a delay of 10 stages is caused before the sum signal S13 is obtained upon supply of the data A0 to A15 and B0 to B15.

In this case, delays in the full adders 1 and 2 are caused simultaneously with those in the full adders 3 and 4 respectively. Further, delays in the carry look ahead circuit 32 and the full adders 15 and 16 are caused simultaneously with the delays T7, T8 and T9 in the full adders 11, 12 and 13. Therefore, it is not necessary to consider the delays in the full adders 1, 2, 15 and 16 and the carry look ahead circuit 32 for calculating the maximum delay time.

Figure 8:
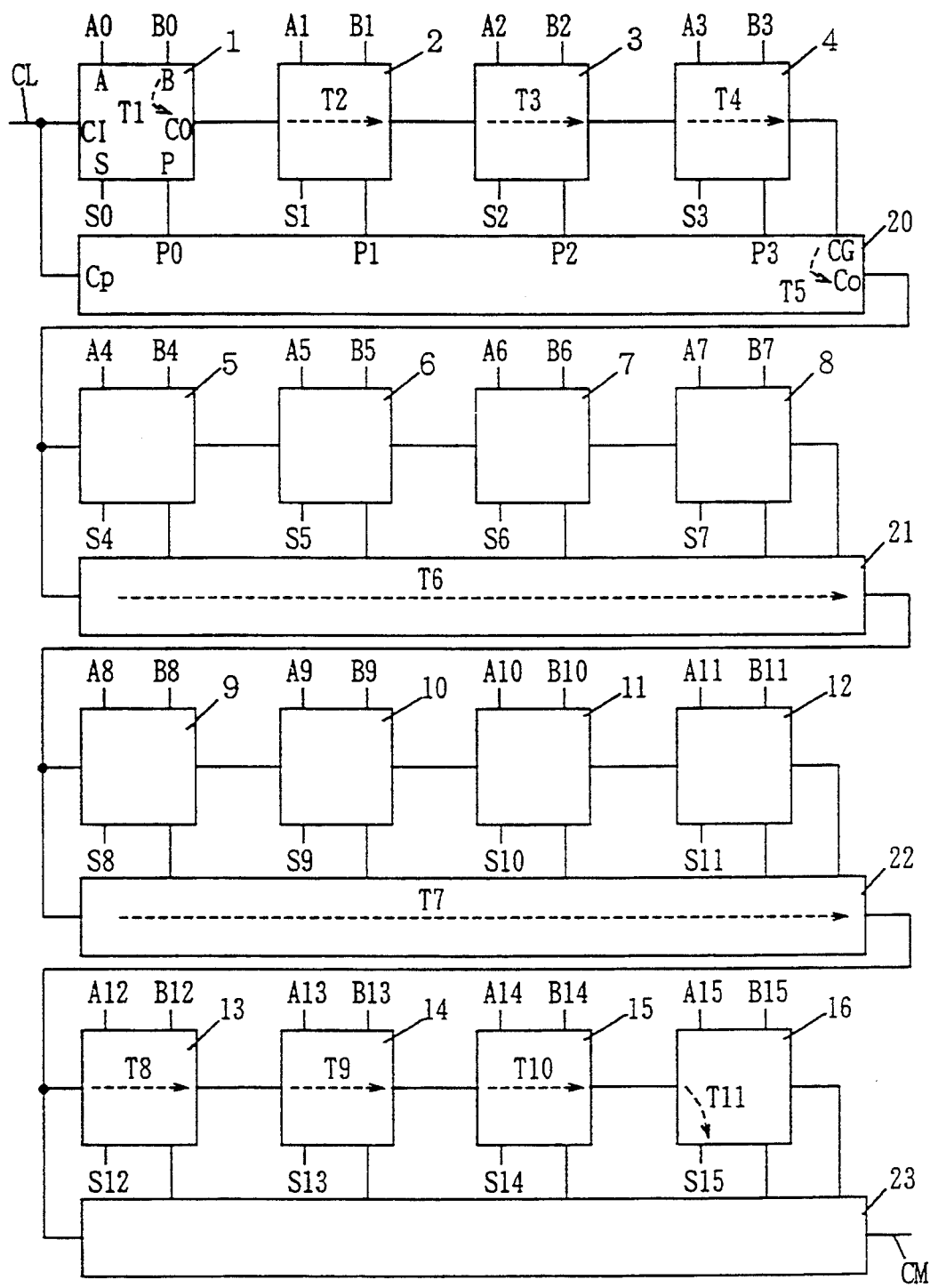
FIG. 8 is a block diagram showing the structure of a conventional adder circuit.

Comparing the adder circuit shown in FIG. 1 with that shown in FIG. 8, the number of the carry look ahead circuits is smaller by one and the maximum delay time is reduced by one stage. According to this embodiment, therefore, it is possible to add data at a high speed with a small number of circuits.

(2) Second Embodiment

Figure 2:
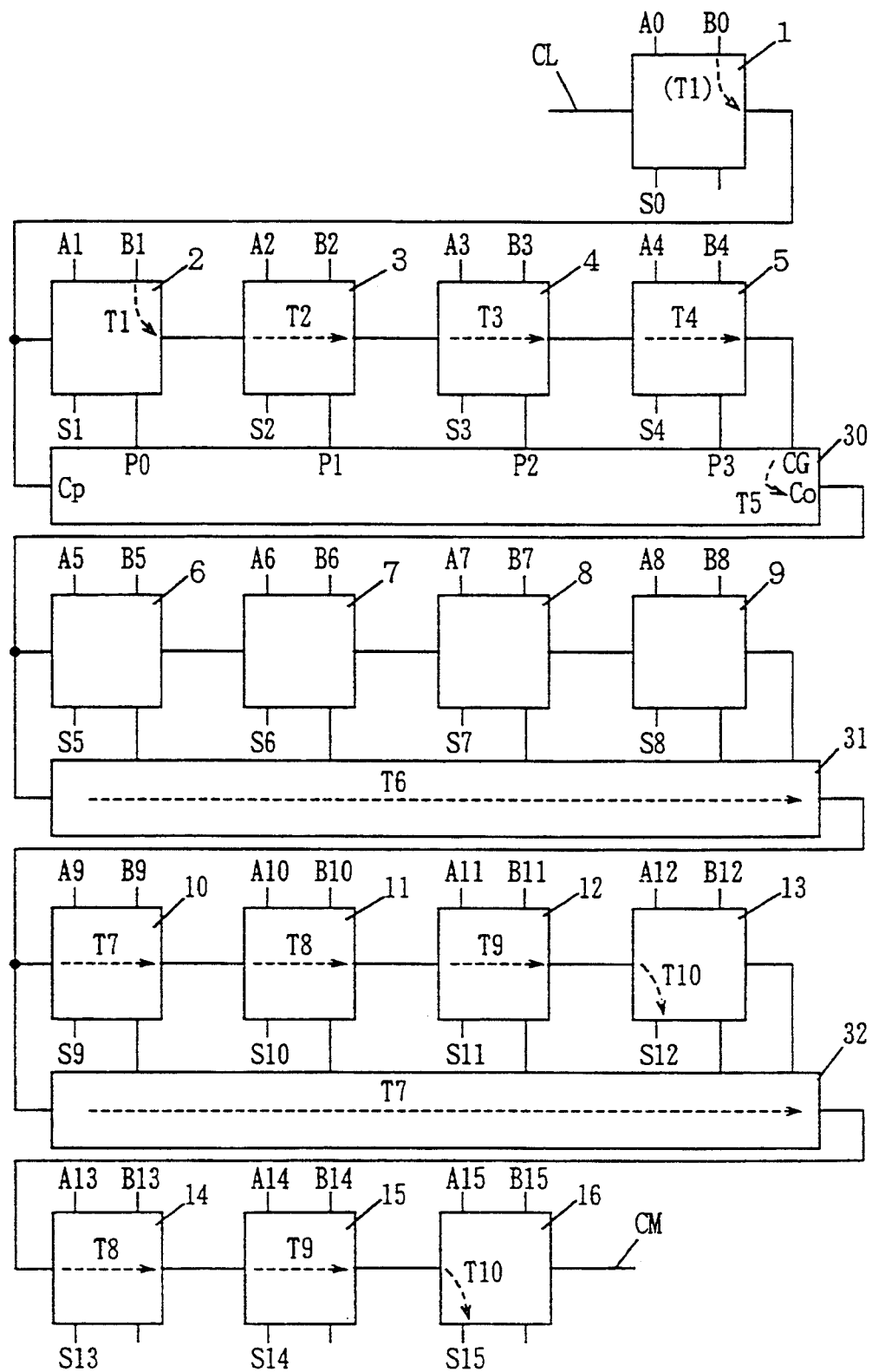
FIG. 2 is a block diagram showing the structure of an adder circuit according to a second embodiment of the present invention.

FIG. 2 is a block diagram showing the structure of an adder circuit according to a second embodiment of the present invention. Similarly to the first embodiment, this adder circuit adds first and second 16-bit data, which are formed by data A0 to A15 and B0 to B15 respectively, to each other.

Also similarly to the first embodiment, this adder circuit includes 16 full adders 1 to 16 corresponding to the data A0 to A15 and B0 to B15, and three carry look ahead circuits 30, 31 and 32.

Except the single full adder 1 provided on the least significant bit side and the three full adders 14, 15 and 16 provided on the most significant bit side, the remaining full adders 2 to 13 are classified into three groups. The first group includes the full adders 2 to 5 and the second group includes the full adders 6 to 9, while the third group includes the full adders 10 to 13.

The carry look ahead circuit 30 is provided for the first group of the full adders 2 to 5 and the carry look ahead circuit 31 is provided for the second group of the full adders 6 to 9, while the carry look ahead circuit 32 is provided for the third group of the full adders 10 to 13.

According to this embodiment, n=16, m=3, k=4, h=1 and i=3.

In the adder circuit shown in FIG. 2, the maximum delay time is caused when the full adder 2 is in a kill or generation state and the remaining full adders 1 and 3 to 16 are in propagation states.

In this case, delays T1, T2, T3 and T4 are caused in the full adders 2, 3, 4 and 5 respectively. On the other hand, delays T5 and T6 are caused in the carry look ahead circuits 30 and 31 respectively. Further, delays T7, T8, T9 and T10 are caused in the full adders 10, 11, 12 and 13 respectively.

At the same time, a delay T7 is caused in the carry look ahead circuit 32, while delays T8, T9 and T10 are caused in the full adders 14, 15 and 16 respectively.

Thus, a delay of 10 stages is caused before sum signals S12 and S15 are obtained upon supply of the data A0 to A15 and B0 to B15.

In this case, a delay in the full adder 1 is caused simultaneously with the delay T1 in the full adder 2. Thus, it is not necessary to consider the delay in the full adder 1 for calculating the maximum delay time.

Comparing the adder circuit shogun in FIG. 2 with that shown in FIG. 8, the number of the carry look ahead circuits is smaller by one and the maximum delay time is reduced by one stage. According to this embodiment, therefore, it is possible to add data at a high speed with a small number of circuits.

(3) Third Embodiment

Figure 3:
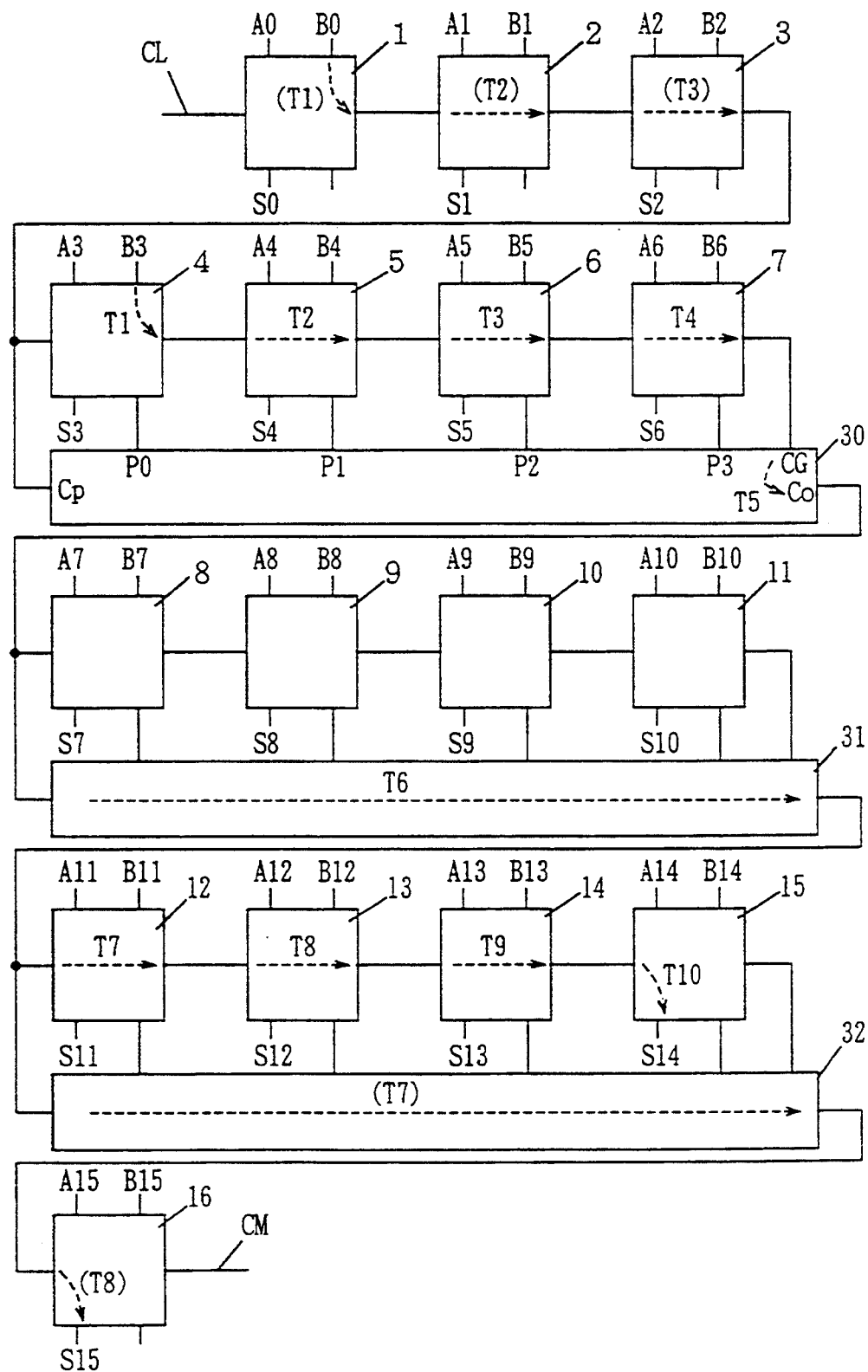
FIG. 3 is a block diagram showing the structure of an adder circuit according to a third embodiment of the present invention.

FIG. 3 is a block diagram showing the structure of an adder circuit according to a third embodiment of the present invention. Similarly to the first embodiment, this adder circuit adds first and second 16-bit data, which are formed by data A0 to A15 and B0 to B15 respectively, to each other.

Also similarly to the first embodiment, this adder circuit includes 16 full adders 1 to 16 corresponding to the data A0 to A15 and B0 to B15, and three carry look ahead circuits 30, 31 and 32.

Except the three full adders 1, 2 and 3 provided on the least significant bit side and the single full adder 16 provided on the most significant bit side, the remaining full adders 4 to 15 are classified into three groups. The first group includes the full adders 4 to 7 and the second group includes the full adders 8 to 11, while the third group includes the full adders 12 to 15.

The carry look ahead circuit 30 is provided for the first group of the full adders 4 to 7 and the carry look ahead circuit 31 is provided for the second group of the full adders 8 to 11, while the carry look ahead circuit 32 is provided for the third group of the full adders 12 to 15.

According to this embodiment, n=16, m=3, k=4, h=3 and i=1.

In the adder circuit shown in FIG. 3, the maximum delay time is caused when the full adder 4 is in a kill or generation state and the remaining full adders 1 to 3 and 5 to 16 are in propagation states.

In this case, delays T1, T2, T3 and T4 are caused in the full adders 4, 5, 6 and 7 respectively. On the other hand, delays T5 and T6 are caused in the carry look ahead circuits 30 and 31 respectively. Further, delays T7, T8, T9 and T10 are caused in the full adders 12, 13, 14 and 15 respectively.

Thus, a delay of 10 stages is caused before a sum signal S14 is obtained upon supply of the data A0 to A15 and B0 to B15.

In this case, delays in the full adders 1, 2 and 3 are caused simultaneously with the delays T1, T2 and T3 in the full adders 4, 5 and 6 respectively. Further, delays in the carry look ahead circuit 32 and the full adder 16 are caused simultaneously with the delays in the full adders 12 and 13 respectively. Therefore, it is not necessary to consider the delays in the full adders 1, 2, 3 and 16 and the carry look ahead circuit 32 for calculating the maximum delay time.

Comparing the adder circuit shown in FIG. 3 with that shown in FIG. 8, the number of the carry look ahead circuits is smaller by one and the maximum delay time is reduced by one stage. According to this embodiment, therefore, it is possible to add data at a high speed with a small number of circuits.

(4) Fourth Embodiment

Figure 4:
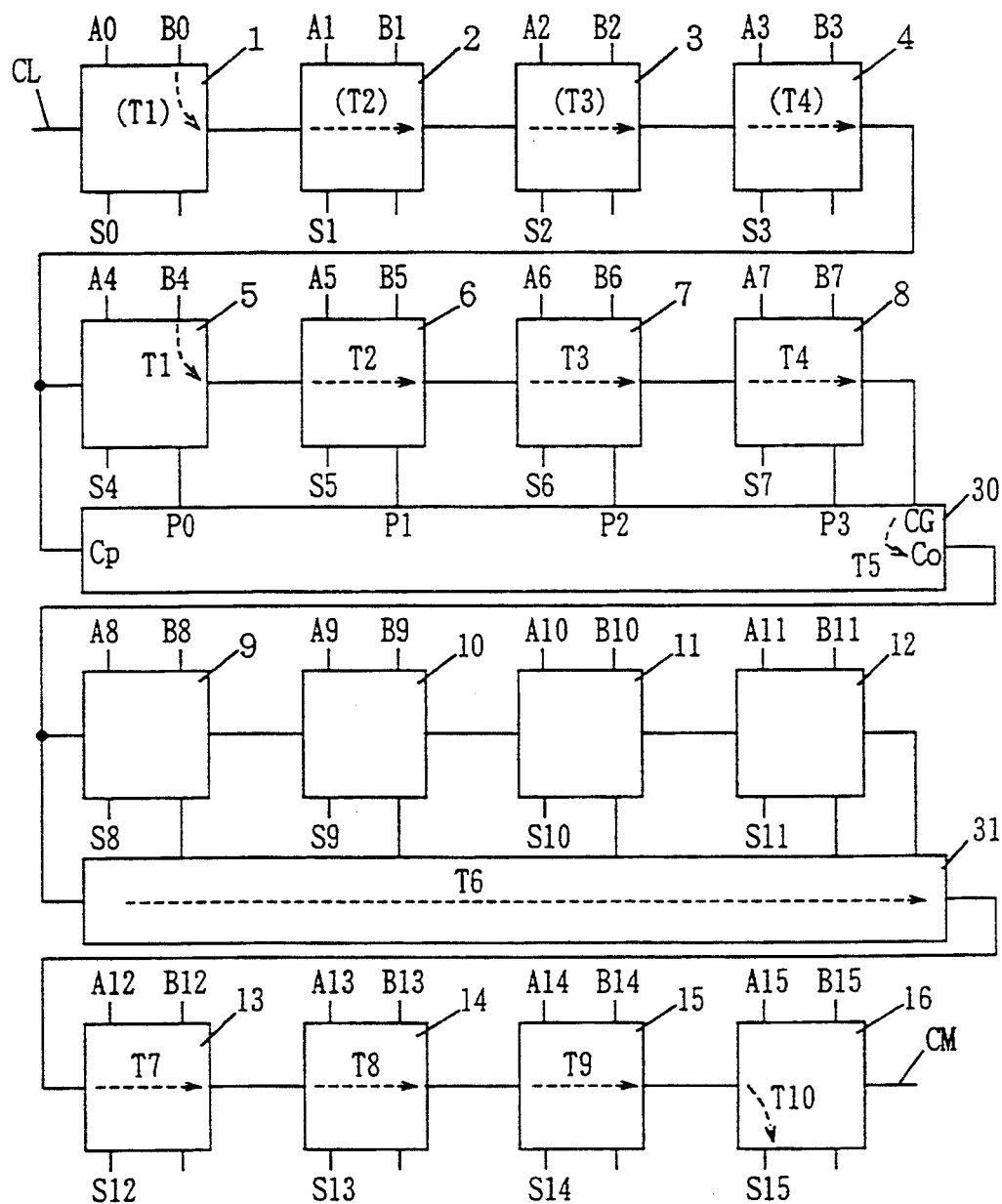
FIG. 4 is a block diagram showing the structure of an adder circuit according to a fourth embodiment of the present invention.

FIG. 4 is a block diagram showing the structure of an adder circuit according to a fourth embodiment of the present invention. Similarly to the first embodiment, this adder circuit adds first and second 16-bit data, which are formed by data A0 to A15 and B0 to B15 respectively, to each other.

Also similarly to the first embodiment, this adder circuit includes 16 full adders 1 to 16 corresponding to the data A0 to A15 and B0 to B15, and two carry look ahead circuits 30 and 31.

Except the four full adders 1, 2, 3 and 4 provided on the least significant bit side and the four full adders 13, 14, 15 and 16 provided on the most significant bit side, the remaining full adders 5 to 12 are classified into two groups. The first group includes the full adders 5 to 8, while the second group includes the full adders 9 to 12.

The carry look ahead circuit 30 is provided for the first group of the full adders 5 to 8, while the carry look ahead circuit 31 is provided for the second group of the full adders 9 to 12.

According to this embodiment, n=16, m=2, k=4, h=4 and i=4.

In the adder circuit shown in FIG. 4, the maximum delay time is caused when the full adder 5 is in a kill or generation state and the remaining full adders 1 to 4 and 6 to 16 are in propagation states.

In this case, delays T1, T2, T3 and T4 are caused in the full adders 5, 6, 7 and 8 respectively. On the other hand, delays T5 and T6 are caused in the carry look ahead circuits 30 and 31 respectively. Further, delays T7, T8, T9 and T10 are caused in the full adders 13, 14, 15 and 16 respectively.

Thus, a delay of 10 stages is caused before a sum signal S15 is obtained upon supply of the data A0 to A15 and B0 to B15.

In this case, delays in the full adders 1, 2, 3 and 4 are caused simultaneously with the delays T1, T2, T3 and T4 in the full adders 5, 6, 7 and 8 respectively. Thus, it is not necessary to consider the delays in the full adders 1, 2, 3 and 4 for calculating the maximum delay time.

Comparing the adder circuit shown in FIG. 4 with that shown in FIG. 8, the number of the carry look ahead circuits is smaller by two and the maximum delay time is reduced by one stage. According to this embodiment, therefore, it is possible to add data at a high speed with a small number of circuits.

Also when a carry look ahead circuit is provided for the full adders 13, 14, 15 and 16, the maximum delay time is for 10 stages.

(5) Fifth Embodiment

Figure 5:
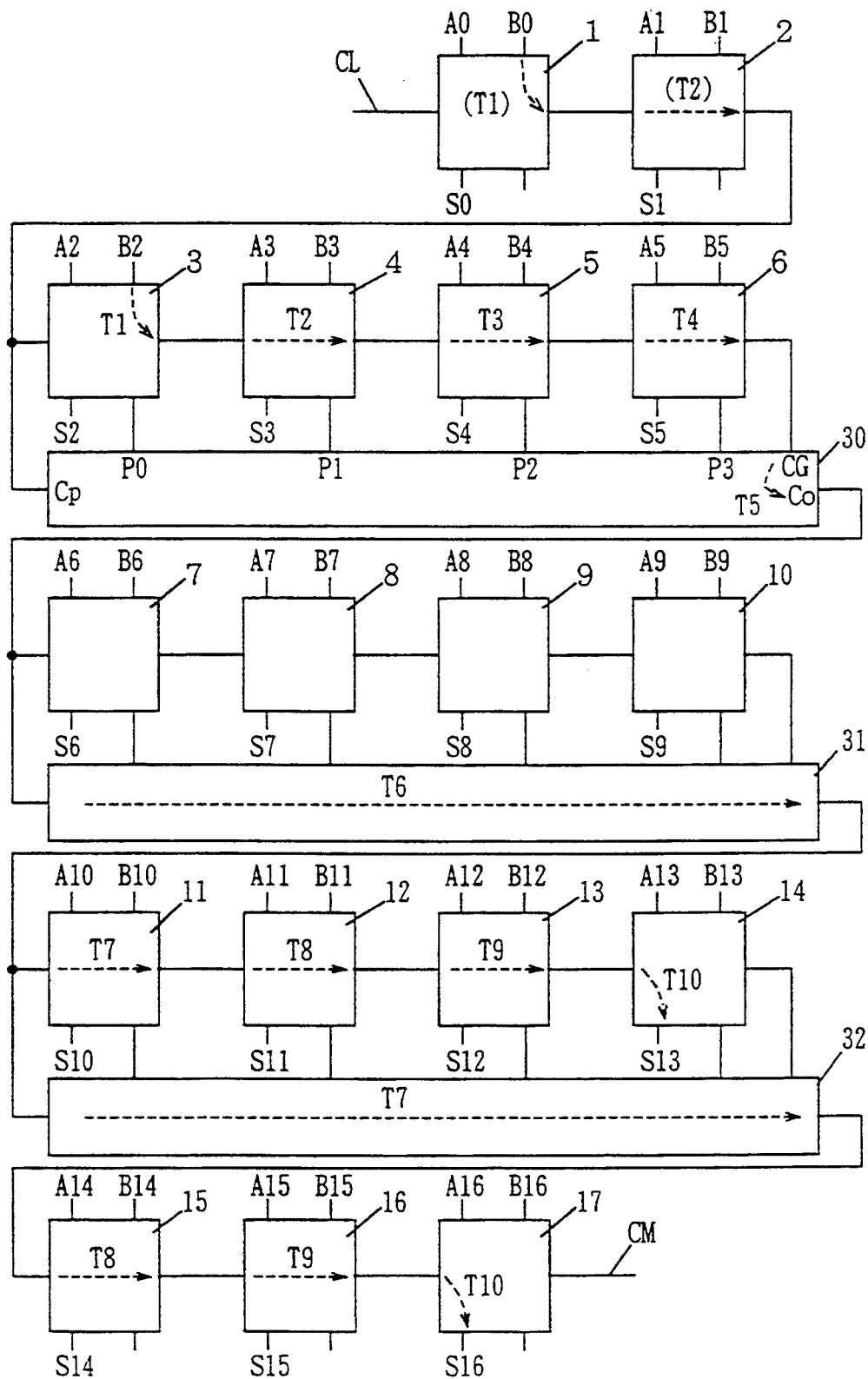
FIG. 5 is a block diagram showing the structure of an adder circuit according to a fifth embodiment of the present invention.

FIG. 5 is a block diagram showing the structure of an adder circuit according to a fifth embodiment of the present invention. This adder circuit adds first and second 17-bit data, which are formed by data A0 to A16 and B0 to B16 respectively, to each other.

This adder circuit includes 17 full adders 1 to 17 corresponding to the data A0 to A16 and B0 to B16, and three carry look ahead circuits 30, 31 and 32.

Except the two full adders 1 and 2 provided on the least significant bit side and the three full adders 15, 16 and 17 provided on the most significant bit side, the remaining full adders 3 to 14 are classified into three groups. The first group includes the full adders 3 to 6 and the second group includes the full adders 7 to 10, while the third group includes the full adders 11 to 14.

The carry look ahead circuit 30 is provided for the first group of the full adders 3 to 6 and the carry look ahead circuit 31 is provided for the second group of the full adders 7 to 10, while the carry look ahead circuit 32 is provided for the third group of the full adders 11 to 14.

According to this embodiment, n=17, m=3, k=4, h=2 and i=3.

In the adder circuit shown in FIG. 5, the maximum delay time is caused when the full adder 3 is in a kill or generation state and the remaining full adders 1, 2 and 4 to 17 are in propagation states.

In this case, delays T1, T2, T3 and T4 are caused in the full adders 3, 4, 5 and 6 respectively. On the other hand, delays T5 and T6 are caused in the carry look ahead circuits 30 and 31 respectively. Further, delays T7, T8, T9 and T10 are caused in the full adders 11, 12, 13 and 14 respectively.

At the same time, a delay T7 is caused in the carry look ahead circuit 32, while delays T8, T9 and T10 are caused in the full adders 15, 16 and 17 respectively. Thus, a delay of 10 stages is caused before sum signals S13 and S16 are obtained upon supply of the data A0 to A16 and B0 to B16.

In this case, delays in the full adders 1 and 2 are caused simultaneously with the delays T1 and T2 in the full adders 3 and 4 respectively. Thus, it is not necessary to consider the delays in the full adders 1 and 2 for calculating the maximum delay time.

Comparing the adder circuit shown in FIG. 5 with that shown in FIG. 8, the number of the carry look ahead circuits is smaller by one and the maximum delay time is reduced by one stage. According to this embodiment, therefore, it is possible to add data at a high speed with a small number of circuits.

(6) Sixth Embodiment

Figure 6:
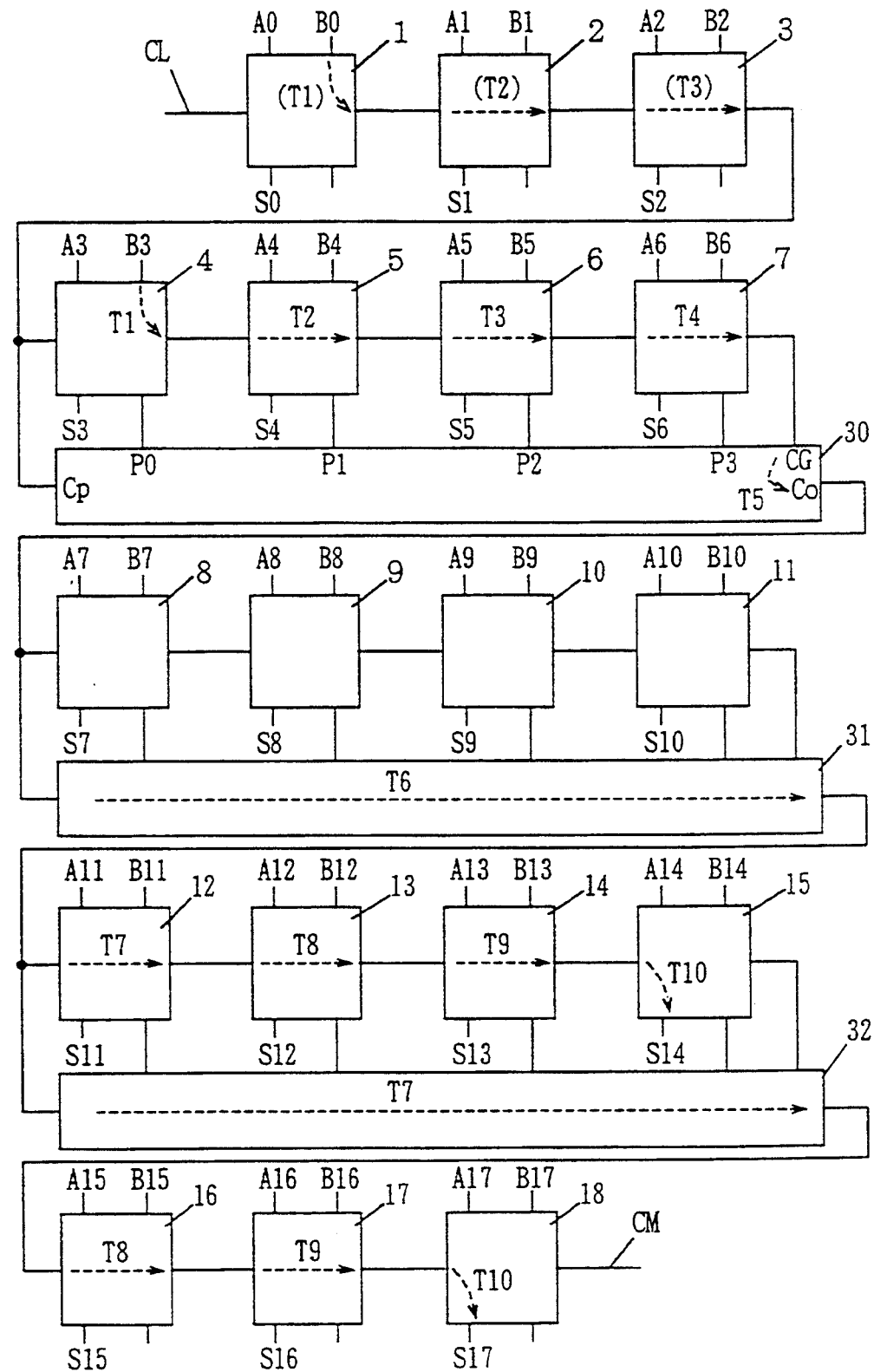
FIG. 6 is a block diagram showing the structure of an adder circuit according to a sixth embodiment of the present invention.

FIG. 6 is a block diagram showing the structure of an adder circuit according to a sixth embodiment of the present invention. This adder circuit adds first and second 18-bit data, which are formed by data A0 to A17 and B0 to B17 respectively, to each other.

This adder circuit includes 18 full adders 1 to 18 corresponding to the data A0 to A17 and B0 to B17, and three carry look ahead circuits 30, 31 and 32.

Except the three full adders 1, 2 and 3 provided on the least significant bit side and the three full adders 16, 17 and 18 provided on the most significant bit side, the remaining full adders 4 to 15 are classified into three groups. The first group includes the full adders 4 to 7 and the second group includes the full adders 8 to 11, while the third group includes the full adders 12 to 15.

The carry look ahead circuit 30 is provided for the first group of the full adders 4 to 7 and the carry look ahead circuit 31 is provided for the second group of the full adders 8 to 11, while the carry look ahead circuit 32 is provided for the third group of the full adders 12 to 15.

According to this embodiment, $n=18$, $m=3$, $k=4$, $h=3$ and $i=3$.

In the adder circuit shown in FIG. 6, the maximum delay time is caused when the full adder 4 is in a kill or generation state and the remaining full adders 1 to 3 and 5 to 18 are in propagation states.

In this case, delays T1, T2, T3 and T4 are caused in the full adders 4, 5, 6 and 7 respectively. On the other hand, delays T5 and T6 are caused in the carry look ahead circuits 30 and 31 respectively. Further, delays T7, T8, T9 and T10 are caused in the full adders 12, 13, 14 and 15 respectively.

At the same time, a delay T7 is caused in the carry look ahead circuit 32, while delays T8, T9 and T10 are caused in the full adders 16, 17 and 18 respectively.

Thus, a delay of 10 stages is caused before sum signals S14 and S17 are obtained upon supply of the data A0 to A17 and B0 to B17.

In this case, delays in the full adders 1, 2 and 3 are caused simultaneously with the delays T1, T2 and T3 in the full adders 4, 5 and 6 respectively. Thus, it is not necessary to consider the delays in the full adders 1, 2 and 3 for calculating the maximum delay time.

Comparing the adder circuit shown in FIG. 6 with that shown in FIG. 8, the number of the carry look ahead circuit is smaller by one and the maximum delay time is reduced by one stage. According to this embodiment, therefore, it is possible to add data at a high speed with a small number of circuits.

(7) Seventh Embodiment

Figure 7:
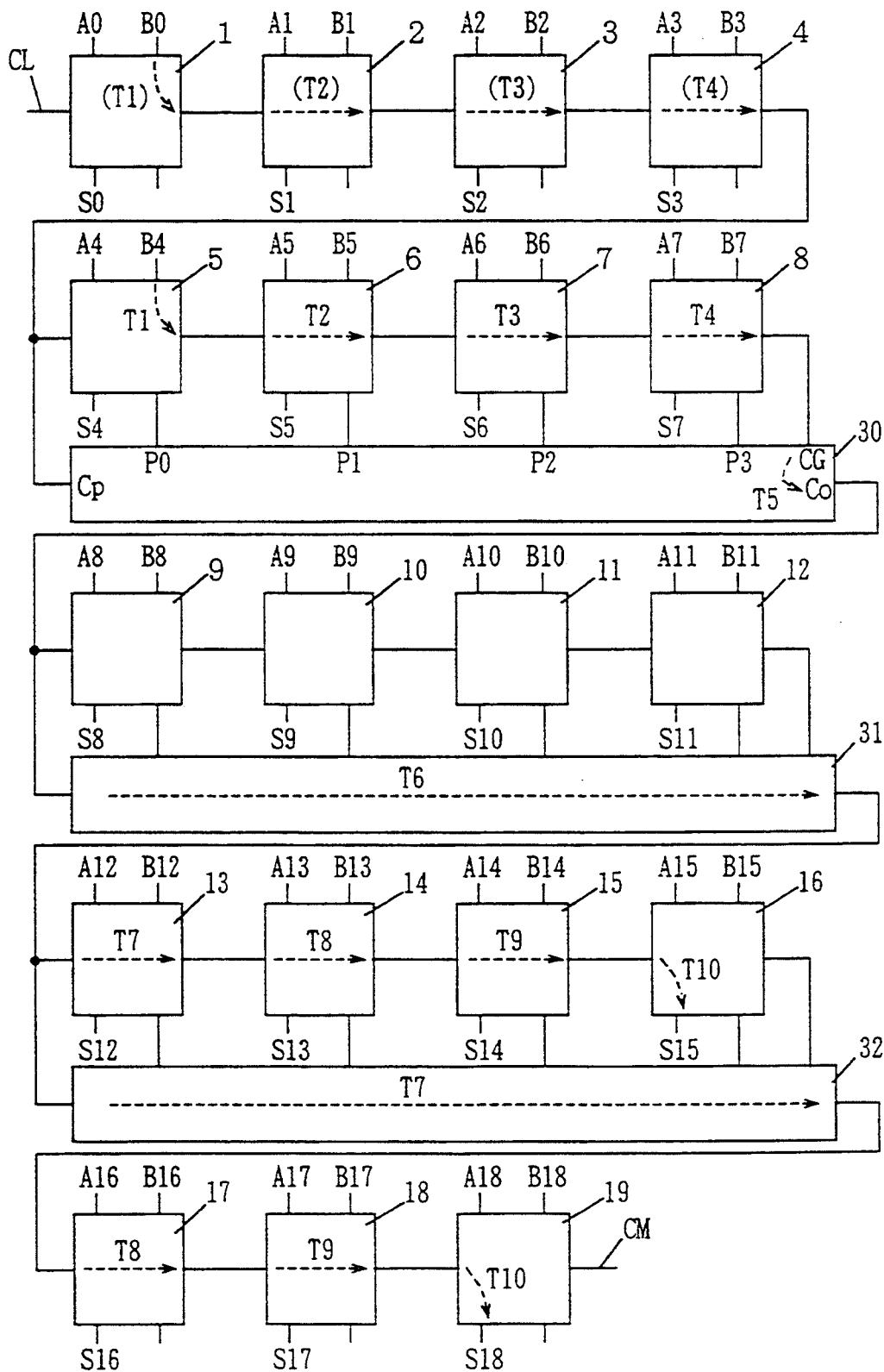
FIG. 7 is a block diagram showing the structure of an adder circuit according to a seventh embodiment of the present invention.

FIG. 7 is a block diagram showing the structure of an adder circuit according to a seventh embodiment of the present invention. This adder circuit adds first and second 19-bit data, which are formed by data A0 to A18 and B0 to B18 respectively, to each other.

This adder circuit includes 19 full adders 1 to 19 corresponding to the data A0 to A18 and B0 to B18, and three carry look ahead circuits 30, 31 and 32.

Except the four full adders 1, 2, 3 and 4 provided on the least significant bit side and the three full adders 17, 18 and 19 provided on the most significant bit side, the remaining full adders 5 to 16 are classified into three groups. The first group includes the full adders 5 to 8 and the second group includes the full adders 9 to 12, while the third group includes the full adders 13 to 16.

The carry look ahead circuit 30 is provided for the first group of the full adders 5 to 8 and the carry look ahead circuit 31 is provided for the second group of the full adders 9 to 12, while the carry look ahead circuit 32 is provided for the third group of the full adders 13 to 16.

According to this embodiment, $n=19$, $m=3$, $k=4$, $h=4$ and $i=3$.

In the adder circuit shown in FIG. 7, the maximum delay time is caused when the full adder 5 is in a kill or generation state and the remaining full adders 1 to 4 and 6 to 19 are in propagation states.

In this case, delays T1, T2, T3 and T4 are caused in the full adders 5, 6, 7 and 8 respectively. On the other hand, delays T5 and T6 are caused in the carry look ahead circuits 30 and 31 respectively. Further, delays T7, T8, T9 and T10 are caused in the full adders 13, 14, 15 and 16 respectively.

At the same time, a delay T7 is caused in the carry look ahead circuit 32, while delays T8, T9 and T10 are caused in the full adders 17, 18 and 19 respectively.

Thus, a delay of 10 stages is caused before sum signals S15 and S18 are obtained upon supply of the data A0 to A18 and B0 to B18.

In this case, delays in the full adders 1, 2, 3 and 4 are caused simultaneously with the delays T1, T2, T3 and T4 in the full adders 5, 6, 7 and 8 respectively. Thus, it is not necessary to consider the delays in the full adders 1, 2, 3 and 4 for calculating the maximum delay time.

Comparing the adder circuit shown in FIG. 7 with that shown in FIG. 8, the number of the carry look ahead circuits is smaller by one and the maximum delay time is reduced by one stage. According to this embodiment, therefore, it is possible to add data at a high speed with a small number of circuits.

In the fifth embodiment, the maximum delay time is for 10 stages also when $h=3$ and $i=2$ or $h=4$ and $i=1$. When $h=1$ and $i=4$ in the fifth embodiment, on the other hand, the maximum delay time is four 11 stages.

Similarly the maximum delay time is for 10 stages also when $h=4$ and $i=2$ in the sixth embodiment. When $h=2$ and $i=4$ in the sixth embodiment, on the other hand, the maximum delay time is for 11 stages.

Further, the maximum delay time is for 11 stages when $h=3$ and $i=4$ in the seventh embodiment.

Thus, the number i is preferably not more than $k-1$ when the number n is not integral times the number k.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An adder circuit for adding two n-bit data to each other, comprising:

n full adders corresponding to said n bits, a plurality of said full adders excluding h said full adders provided on the least significant bit side and i said full adders provided on the most significant bit side being classified into m groups, each of said m groups including k said full adders; and m carry look ahead means, provided in correspondence to said m groups, each being connected to said k full adders included in corresponding said group, said h and said i representing integers of at least 1 and not more than k respectively.

2. An adder circuit in accordance with claim 1, wherein said n, said m, said h, said i and said k satisfy the following relation:

$$n = h + k \cdot m + i$$

3. An adder circuit in accordance with claim 2, wherein said i is at least 1 and not more than k in the case where said n is integral times said k, while said i is at least 1 and not more than k−1 in the case where said n is not integral times said k.

4. An adder circuit in accordance with claim 1, wherein each of said n full adders includes:
a first input terminal for receiving a corresponding 1-bit data of one said n-bit data,
a second input terminal for receiving a corresponding 1-bit data of the other said n-bit data,
a carry input terminal for receiving a carry signal from a low order bit side,
a propagation detecting terminal for outputting a propagation detecting signal,
a sum signal output terminal for outputting a sum signal, and
a carry output terminal for outputting a carry signal to be supplied to a high order bit side, and each of said m carry look ahead means includes:
a propagation carry input terminal for receiving a carry signal from a low order bit side,
k propagation detecting input terminals for receiving propagation detecting signals outputted from corresponding said k full adders,
a generation carry input terminal for receiving a carry signal from one of said corresponding k full adders being provided on the most significant bit side, and
a carry output terminal for outputting a carry signal to be supplied to a high order bit side.

5. An adder circuit in accordance with claim 4, wherein each of said n full adders includes:
logical means for obtaining exclusive OR of said 1-bit data received in said first and second input terminals and supplying the same to said propagation detecting terminal as said propagation detecting signal, and
first propagation means for propagating a carry signal received in said carry input terminal to said sum signal output terminal as said sum signal and propagating a 1-bit data received in one of said first and second input terminals to said carry output terminal as a carry signal when said propagation detecting signal is at a first logical value while supplying an inversion signal of a carry signal received in said carry input terminal to said sum signal output terminal as said sum signal and propagating a carry signal received in said carry input terminal to said carry output terminal when said propagation detecting signal is at a second logical value.

6. An adder circuit in accordance with claim 5, wherein each of said m carry look ahead means includes:
second propagation means for propagating a carry signal received in said generation carry input terminal to said carry output terminal when any of said propagation detecting signals received in said k propagation detecting terminals is at a first logical value while propagating a carry signal received in said propagation carry input terminal to said carry output terminal when all propagation detecting signals received in said k propagation detecting terminals are at a second logical value.

7. A method of adding two n-bit data to each other, comprising the steps of:

preparing n full adders corresponding to said n bits, a plurality of said full adders excluding h said full adders provided on the least significant bit side and i said full adders provided on the most significant bit side being classified into m groups, each of said m groups including k said full adders;
connecting m carry look ahead circuits corresponding to said m groups to said k full adders in corresponding ones of said m groups respectively; and
supplying said two n-bit data to said n full adders,
said h and said i representing integers of at least 1 and not more than k respectively.

8. A method in accordance with claim 7, wherein said n, said m, said h, said i and said k satisfy the following relation:

$$n = h + k \cdot m + i$$

9. A method in accordance with claim 8, wherein said i is at least 1 and not more than said k in the case where said n is integral times said k, while said i is at least 1 and not more than k−1 in the case where said n is not integral times said k.

* * * * *